(12) United States Patent
Mokrushin et al.

(10) Patent No.: US 8,707,418 B2
(45) Date of Patent: Apr. 22, 2014

(54) SYSTEM AND METHODS FOR WEB-APPLICATION COMMUNICATION

(75) Inventors: Leonid Mokrushin, Uppsala (SE); Vladimir Katardjiev, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 108 days.

(21) Appl. No.: 13/504,055

(22) PCT Filed: Nov. 6, 2009

(86) PCT No.: PCT/SE2009/051271
§ 371 (c)(1),
(2), (4) Date: Apr. 25, 2012

(87) PCT Pub. No.: WO2011/056110
PCT Pub. Date: May 12, 2011

(65) Prior Publication Data
US 2012/0226908 A1    Sep. 6, 2012

(51) Int. Cl.
*G06F 9/00*     (2006.01)
*G06F 15/16*    (2006.01)
*G06F 17/00*    (2006.01)
*G06F 7/04*     (2006.01)
*G06F 17/30*    (2006.01)
*G06F 12/00*    (2006.01)
*G06F 12/14*    (2006.01)
*G06F 13/00*    (2006.01)
*G06C 7/00*     (2006.01)
*H04L 29/06*    (2006.01)
*H04L 9/32*     (2006.01)

(52) U.S. Cl.
CPC ........ *H04L 63/0884* (2013.01); *H04L 63/0823* (2013.01); *H04L 63/0815* (2013.01); *H04L 63/0281* (2013.01); *H04L 63/0471* (2013.01); *H04L 63/08* (2013.01); *H04L 65/105* (2013.01)
USPC ...... 726/12; 726/8; 726/10; 726/18; 713/156; 713/175

(58) Field of Classification Search
CPC ............ H04L 63/0281; H04L 63/0815; H04L 63/0823; H04L 63/0884; H04L 65/105
USPC ......................................... 726/8, 10; 713/175
See application file for complete search history.

(56) References Cited

U.S. PATENT DOCUMENTS

2007/0150737 A1    6/2007    Parupudi et al.
2009/0126001 A1*   5/2009    Krantz et al. .................. 726/10

(Continued)

FOREIGN PATENT DOCUMENTS

CN    1937632 A      3/2007
EP    1976199 A1 *   10/2008

(Continued)

OTHER PUBLICATIONS

Dotson, "Certificate Authentication in SIP" draft-dotson-sip-certificate-auth-04, http://tools.ietf.org/html/draft-dotson-sip-certificate-auth-04, Nov. 6, 2007.*

(Continued)

*Primary Examiner* — Andrew Nalven
*Assistant Examiner* — Quy Pham
(74) *Attorney, Agent, or Firm* — Coats and Bennett PLLC

(57) ABSTRACT

A system for providing communication between one or more clients (50) and one or more service providers (70) is disclosed. The system comprises an access gateway (10) for maintaining transport-specific connections for one or more connections between the client (50) and the access gateway (10), an application level router (20) for routing messages between clients (50) and service providers (70), an authentication provider (40) for verifying the identity of users of clients (50), and a look-up service (30) for keeping a registry of currently available services. Various methods related to the system are also disclosed.

14 Claims, 7 Drawing Sheets

(56) References Cited

U.S. PATENT DOCUMENTS

2010/0138899 A1* 6/2010 Yamamoto et al. ............... 726/3
2011/0202986 A1* 8/2011 Horn et al. ........................ 726/7

FOREIGN PATENT DOCUMENTS

| GB | 2392068 A | | 2/2004 |
|----|-----------|---|--------|
| WO | 2007096001 A1 | | 8/2007 |
| WO | WO 2007096001 A1 | * | 8/2007 |

OTHER PUBLICATIONS

Dotson "SIP Certificate Authentication Solution" draft-dotson-sip-certificate-auth-sol-00.txt, Feb. 4, 2007.*
S. Dotson, "SIP Certificate Authentication Solution", draft-dotson-sip-certificate-auth-sol-00.txt, SIP Internet-Draft; CableLabs, Feb. 4, 2007, pp. 1-7.
S. Dotson, "Certificate of Authentication in SIP", draft-dotson-sip-certificate-auth-04; SIP Internet Draft; Nov. 6, 2007; pp. 1-9.
3G Americas, "IPv6—LTE and Evolved Packet Core", Feb. 2009, pp. 1-37.
LTE and the Evolution to 4G Wireless, Design and Measurement Challenges, Security in the LTE-SAE Network; www.agilent.com/find/lte; pp. 2-6.
Bargh, M.S. et al., "UMTS-AKA and EAP-AKA Inter-working for Fast Handovers in All0IP Networks", Appears in: Globecom Workships, 2007 IEEE: On pp. 1-6, Nov. 26-30, 2007; http://ieeexplore.ieee.org/xpls/abs_all.jsp?arnumber=4437814&tag=1; Paragraphs I-IV.
Allan MacPhee, "Understanding Digital Certificates and Wireless Transport Layer Security (WTLS)", Entrust, Jan. 2001; Version 1.1; whole document.
Menezes, A. et al., "Handbook of Applied Cryptography", 1997, pp. 397, 400-405, 548, 549, 559, and 560, CRC Press, Inc., US.

* cited by examiner

SYSTEM AND METHODS FOR WEB-APPLICATION COMMUNICATION

TECHNICAL FIELD

The present invention relates to a system and methods for web-application communication.

BACKGROUND

Web applications are nowadays gaining momentum thanks to standardization and cross-platform uniformity of web technologies. A web application in this context is a set of collaborative computer programs spanning both clients and servers. Client-side parts of a web application may e.g. be accessed via a web browser over a network such as the Internet. They may be coded in a browser-supported language (such as HTML, JavaScript, etc.) and reliant on a common web browser to render the application executable. Server-side parts of a web application are often referred to as web services. They usually do not have a UI part, are coded using different programming languages (such as Java, PHP, Ruby, Python, Perl etc.) and executed on an infrastructure of application servers. In this application, both client and server parts of a web application are referred to as resources.

A significant aspect of a web application is its ability to communicate messages between its resources and with the resources corresponding to other web applications. In this regard, every direction of the communication may be of importance, namely client-to-server, server-to-client, client-to-client and server-to-server, as each of them opens up for new types of applications and/or user experiences.

The majority of today's web applications utilize (inherently unidirectional) HTTP for communication over TCP/IP networks. However, the diversity of devices enabled to run web applications (such as mobile phones, PDAs, TVs, MIDs etc.) is growing. So does the variety of networks (e.g. 3G, Wi-Fi, Ethernet, Bluetooth etc.) and methods (e.g. HTTP, WebSockets, XMPP, BOSH, Bayeux, IMS, SIP, SMS etc.) these devices use to communicate with the rest of the world. Naturally, not all of the devices support every mean of communication. Hence, there is a need for improved web-application communication among such heterogeneous devices.

SUMMARY

Accordingly, an object of the present invention provide for web-application communication among heterogeneous devices.

According to a first aspect, there is provided a method in an access gateway (AG) of registering a client in the AG. Said AG is adapted for operation in a system for providing communication between one or more clients and one or more service providers (SP) via the AG and an application-level router (AR). Furthermore, said system comprises the AG, the AR, and an authentication provider (AP). The method comprises:

a) receiving, from the client, a first registration message comprising a global user identifier (GUID), which is a uniform resource identifier (URI) on the AP for verifying the identity of a user of the client, and a public key of the client;

b) issuing a local user identifier (LUID), which is a URI of a resource of the AG that maintains the client's connection to the AG;

c) sending, via the AR to the AP, a second registration message comprising the GUID, the client's public key, and the LUID;

d) receiving, via the AR from the AP, a first authentication challenge message;

e) forwarding the first authentication challenge message to the client;

f) receiving, from the client, a first authentication response to the first authentication challenge message for authentication of the user's identity;

g) forwarding, to the AP via the AR, the first authentication response; and h) receiving, from the AP via the AR, a result message indicating whether the first authentication response successfully authenticated the identity of the user, and, if the identity of the user was successfully authenticated, comprising an identity certificate comprising said LUID, the client's public key, and the GUID, wherein said identity certificate is encrypted with the AP's private key.

The method may further comprise, if the result message indicates that the identity of the user was successfully authenticated, i) obtaining the AP's public key;

j) decrypting and storing the identity certificate; and k) sending the LUID to the client.

Furthermore, the method may comprise, if the result message indicates that the identity of the user was not successfully authenticated, l) returning to step d).

According to a second aspect, there is provided a method in an AG of establishing a connection between a client and an SP. Said AG is adapted for operation in a system for providing communication between one or more clients and one or more SPs via the AG and an AR. Said system comprises the AG, the AR, and an AP. The method comprises registering the client in the AG using the method according to the first aspect. Furthermore, the method comprises receiving, from the client, a first service request message requesting establishment of said connection, wherein the first request message comprises the LUID and an indication of the SP, and sending, to the SP via the AR, a second service request message comprising the LUID and a URI of the identity certificate on the AG. Moreover, the method comprises receiving, from the SP via the AR, a certificate request message comprising said URI of the identity certificate, and sending the identity certificate to the SP via the AR for allowing the SP to verify the authenticity of the identity certificate using the AP's public key. In addition, the method comprises receiving, from the SP via the AR, a second authentication challenge message comprising a shared secret encrypted with the client's public key, and forwarding the second authentication challenge message to the client. The method also comprises receiving, from the client, a second authentication response comprising the shared secret decrypted from the second authentication challenge message using the client's private key, and forwarding the second authentication response to the SP via the AR. The method further comprises receiving, from the SP via the AR, a service response message indicating whether the SP has accepted the requested establishment of said connection, and forwarding the service response message to the client.

According to a third aspect, there is provided a method in an AG of removing a registration of a client in the AG. Said AG is adapted for operation in a system for providing communication between one or more clients and one or more SPs via the AG and an AR. Said system comprises the AG, the AR, and an AP. The client has been registered in the AG using the method according to the first aspect. The method comprises receiving, from the client, a removal request message comprising the LUID. Furthermore, the message comprises, in response to receiving the removal request message, removing the registration of the client in the AG and sending an acknowledgement message to the client indicating that the registration has been removed.

According to a fourth aspect, there is provided a method in an AG of providing communication from a client to a network entity (NE), which is either another client or an SP. Said AG is adapted for operation in a system for providing communication between one or more clients and one or more SPs via the AG and an AR. Said system comprises the AG, the AR, and an AP. The client has been registered in the AG using the method according to the first aspect. The method comprises receiving, from the client, a message comprising an address to the NE, a path to a resource on the NE, and a message body. Furthermore, the method comprises sending, to the NE, a message comprising said address to the NE, said path to the resource on the NE, said message body, and a URI on the AG to the identity certificate of the client.

According to a fifth aspect, there is provided a method in an AG of providing communication to a client from an NE, which is either another client or an SP. Said AG is adapted for operation in a system for providing communication between one or more clients and one or more SPs via the AG, and an AR. Said system comprises the AG, the AR, and an AP. The client has been registered in the AG using the method according to the first aspect. The method comprises receiving, from the NE, a message comprising the LUID issued for the client, a path to a resource on the client, and a message body. Furthermore, the method comprises sending, to the client, a message comprising said LUID, said path to the resource on the client, and the message body.

According to a sixth aspect, there is provided a method in an AR of handling a message with a destination to a service the AR is not aware of. Said AR is adapted for operation in a system for providing communication between one or more clients and one or more SPs via an AG and the AR. Said system comprises the AG, the AR, and a look-up service (LS) adapted to keep a registry of descriptors of available services, said descriptors comprising a physical address to the SP providing the service. The method comprises sending, to the LS, a lookup message comprising an identifier of the service and an identifier of the corresponding SP. Furthermore, the method comprises receiving, from the LS, the descriptor of the service.

According to a seventh aspect, there is provided a method in an AG of applying a quality of service (QoS) directive to a message from an SP to a client. Said AG is adapted for operation in a system for providing communication between one or more clients and one or more SPs via the AG and an AR. Said system comprises the AG, the AR, an AP, and an LS adapted to keep a registry of descriptors of available services, said descriptors comprising a public key of the SP providing the service. The client has been registered in the AG using the method according to the first aspect. The method comprises receiving, from the SP via the AR, the message to the client. Furthermore, the method comprises receiving, from the AR, the QoS directive. Moreover, the method comprises sending, to the LS, a look up message comprising an identifier of the SP. In addition, the method comprises receiving, from the LS, a response to the look up message, said response comprising the descriptor of the SP. The method also comprises verifying the integrity of the QoS directive using the SP's public key and determining whether the SP is allowed to request the application of the QoS directive. The method further comprises, if the SP is allowed to request the application of the QoS directive, sending the message to the client with the QoS directive applied.

The QoS directive may be included in the message sent from the SP. Alternatively, the system may further comprise a QoS generator adapted to generate QoS directives, and the QoS directive may be sent to the AR from the QoS generator in response to the AR sending the message from the SP to the QoS generator.

The step of determining whether the SP is allowed to request the application of the QoS directive may comprise consulting an internal list of the AG indicating what SPs that are allowed to request application of what QoS directives. Alternatively, the step of determining whether the SP is allowed to request the application of the QoS directive may comprise consulting a partnering service (PS) external to the AG, wherein the PS is adapted to keep track of what SPs that are allowed to request application of what QoS directives.

According to an eighth aspect, there is provided AG for operation in a system for providing communication between one or more clients and one or more SPs. Said system comprises the AG, an AR for routing messages between clients and SPs, an AP for verifying the identity of users of clients, and an LS for keeping a registry of currently available services. The AG is adapted to, for each client connected to it, maintain transport-specific connections for one or more connections between the client and the AG over one or more access networks, and assign, to the client, a LUID, which is a URI that can be used for accessing resources of the client regardless of which access network the client is connected via. The AG may further be adapted to perform one or more of the methods according to the first, second, third, fourth, fifth, or seventh aspects.

According to a ninth aspect, there is provided an AR for operation in a system for providing communication between one or more clients and one or more SPs. Said system comprises an AG according to the eight aspect, the AR, an AP for verifying the identity of users of clients, and an LS for keeping a registry of currently available services. The AR is adapted to route messages between clients and SPs. The AR may further be adapted to perform the method according to the sixth aspect.

According to a tenth aspect, there is provided an AP for operation in a system for providing communication between one or more clients and one or more SPs. Said system comprises an AG according to the eighth aspect, an AR according to the ninth aspect, the AP, and an LS for keeping a registry of currently available services. The AP is adapted to verify the identity of users of clients.

According to an eleventh aspect, there is provided a system for providing communication between one or more clients and one or more SPs. The system comprises an AG according to the eighth aspect, an AR according to the ninth aspect, an AP according to the tenth aspect, and an LS for keeping a registry of currently available services.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
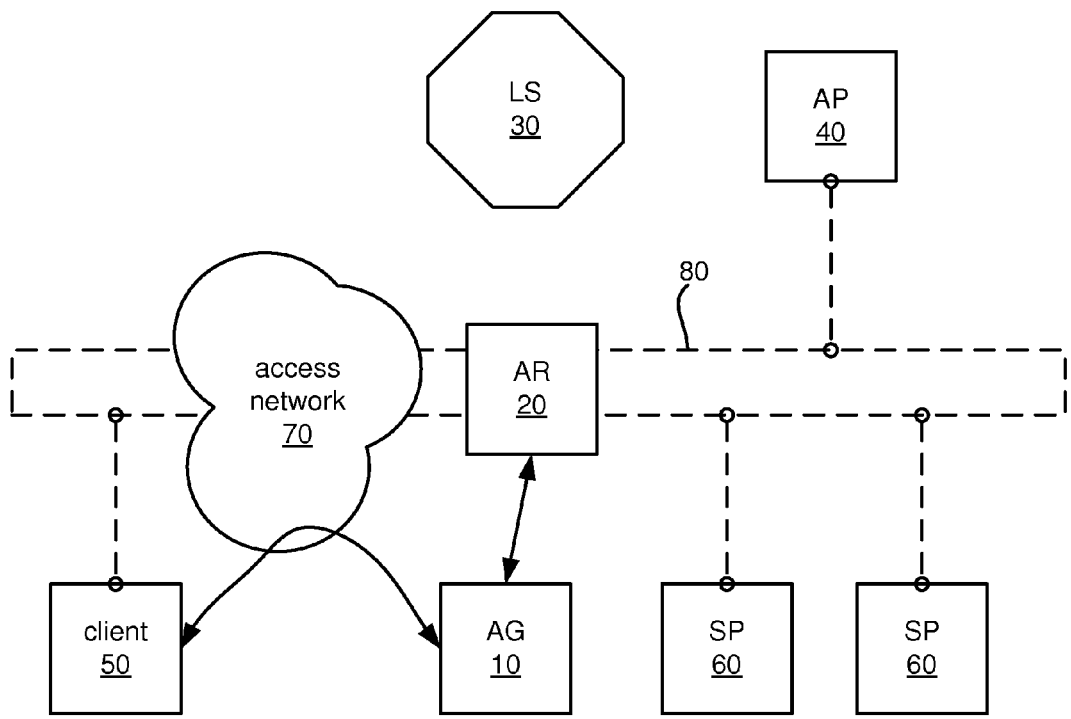
FIG. 1 schematically illustrates a system according to an embodiment of the present invention.

FIG. 1 schematically illustrates a system according to an embodiment of the present invention. The system according to this embodiment comprises an Access Gateway (AG) 10, an Application-level Router (AR) 20, a Lookup Service (LS) 30, and an Authentication Provider (AP) 40 that communicate with one or more clients 50 and Service Providers (SP) 60. Application resources are assigned globally addressable identifiers allowing for any direction of inter-application messaging. The AG 10 is an access point that maintains transport specific connections between the clients connected to it and the access network 70 it belongs to. The AG 10 maps these connections to the identifiers that it assigns to clients 50 upon connection initialization. The AG 10 may be capable of maintaining multiple connections to a client for QoS (Quality of Service) control purposes. The routing of the messages through the network is performed by the AR 20. Thus, the AR 20 forms a logical "Bus" 80 between clients 50 and network resources. Optionally, the AR 20 can be extended with composition algorithms that compute more complex message routes in order to provide value added services. The LS 30 is a registry of web applications and their properties used for address resolution and discovery. A number of inter-related methods related to the system is also provided in accordance with embodiments of the invention described below.

A web application comprises resources that are executed either on the client side or in the network. A resource may be identified by means of a URI (Uniform Resource Identifier) using the following generic URI compliant syntax:

warp://<provider>:<service>[/<path>]

A resource URI comprises a scheme followed by a colon and a double slash (warp://), an authority (<provider>:<service>) comprised of a provider name and a service name separated by a colon, and an optional resource path (/<path>). The authority part specifies a service (e.g. a web server or a mobile device web runtime environment) hosting the resource being identified by the URI, while the path part locates the resource on that service. Note that the above syntax is merely an example and that other syntaxes may be used as well in some embodiments of the invention.

Figure 2:
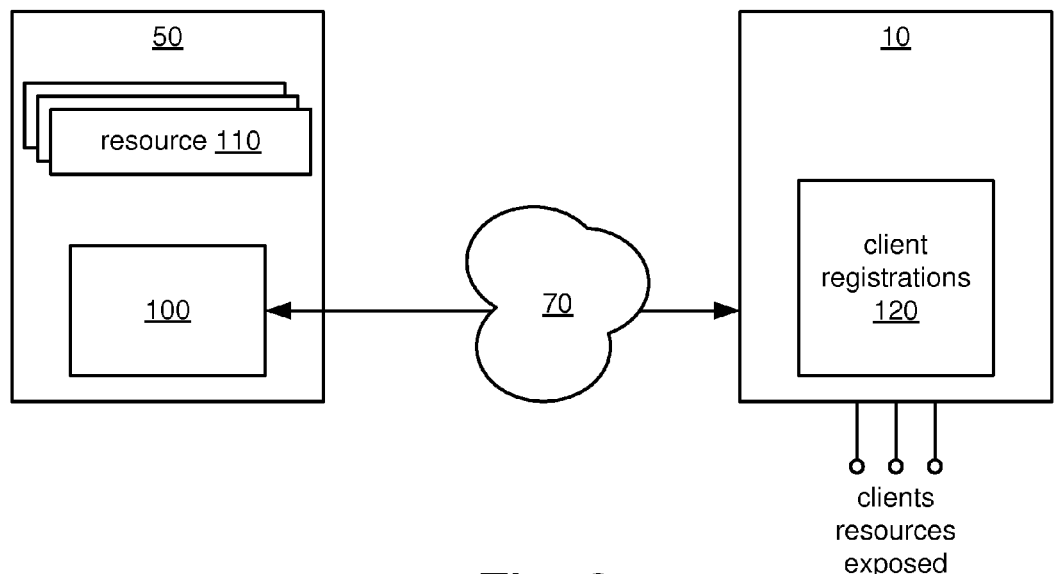
FIG. 2 schematically illustrates a client connected to an access gateway according to an embodiment of the present invention.

Clients 50 attach to the system by establishing a connection over an access network 70 to the AG 10 using their access network connectivity layer 100 as illustrated in FIG. 2. Thus AGs 10 act as client adaptors to different types of access networks 70 and perform connection maintenance specific to those networks. When a client connects to the AG 10, the latter registers a newly generated URI of the client in its internal database 120 of client registrations. Effectively the client 50 becomes a new service in the system exposing its resources 110 addressable via resource path of the client's 50 URI. Because a client's URI is independent of the connectivity method and the type of access network 70 that the client connects via to the AG 10, it is possible to address and inter-communicate with clients 50 coupled with the system over different types of access networks.

In accordance with embodiments of the present invention, there are two types of identifiers associated with every client 50 that connects via the AG 10. The first one is Global User Identifier (GUID) representing the identity of a user that currently operates the client. A GUID is a URI to a resource located at an authority issuing, maintaining, and verifying user identities. For example, warp://er:auth/leo could be a GUID representing user leo at the authority service auth provided by the provider er. The service er: auth can be queried to verify the authenticity of leo's identity using, for example, a challenge-response mechanism.

The second type of a client identifier is Local User Identifier (LUID) issued by the AG 10 for the duration of a session with the client 50. A LUID is a URI to a resource located at the AG 10 that maintains the client's connection. For example, warp://er:gw/leo-1 could be a LUID of the client that belongs to the user leo at the gateway gw provided by er. The mapping between GUIDs and LUIDs can be maintained by the GUID authority and can be used in order to discover the current URIs of the user clients.

Figure 3:
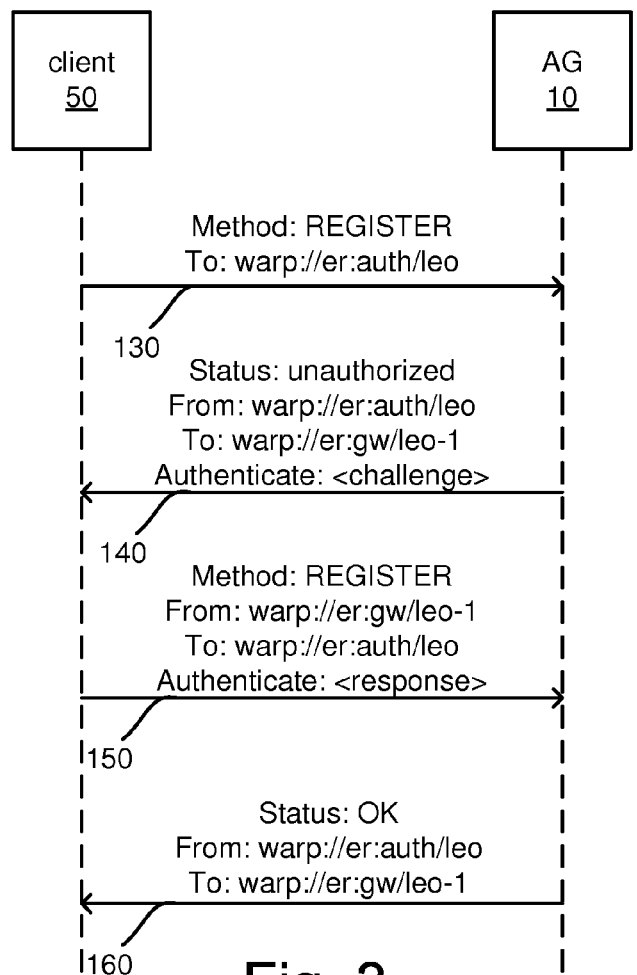
FIGS. 3-11 illustrate interaction between various components of a system according to embodiments of the present invention.

FIG. 3 is a sequence diagram illustrating the dialog between a client 50 and the AG 10 during the registration process according to an embodiment. The messages 130-160 denote the payloads of the corresponding transport messages that are access network specific and in this context are abstracted away. A message comprises a set of headers (such as Method, To, From etc.) and an optional body.

In the first message 130 the client 50 asks the AG 10 to be registered using REGISTER method and specifying its GUID in the To header. The second message 140 passed back to the client contains newly associated LUID in the To header and the challenge issued by the GUID authority in the Authenticate header, to which the client 50 responds in the Authorization header of the third message 150. Finally, the fourth message 160 from the GUID authority to the client 50 contains the positive registration result in the Status header. Further details of an embodiment of the authentication process is presented in the context of FIG. 10.

According to embodiments of the present invention, there is provided a method of removing a registration of a client 50 in the AG 10 (or a "deregistration procedure"). The client 50 sends a removal request message, which is received by the AG 10. The removal request message comprises the LUID of the client. In response thereto, the AG 10 removes the registration of the client 50 in the AG 10. Furthermore, the AG 10 sends an acknowledgement message to the client 50 indicating that the registration has been removed.

Figure 4:
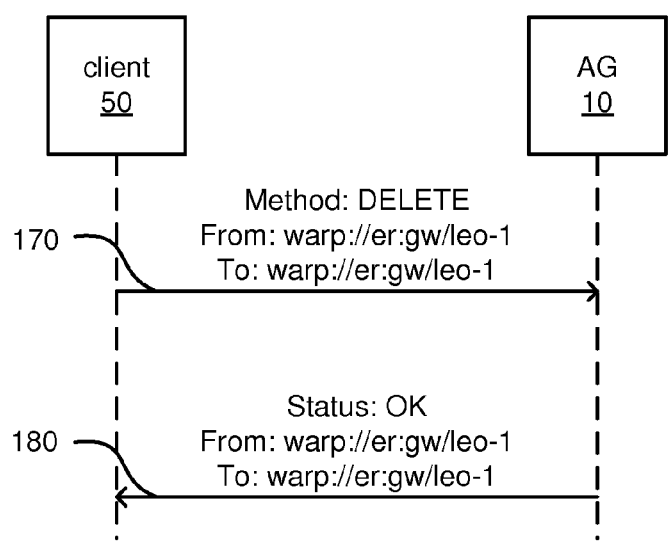

FIG. 4 is a sequence diagram of a deregistration procedure according to an embodiment of the present invention. The client 50 sends a message 170 (above "removal request message") specifying its own LUID as recipient and DELETE in the Method header. A deregistration result message 180 (above "acknowledgement message") is sent to the client, and its LUID is invalidated and the registration is removed from the AG 10.

Figure 5:
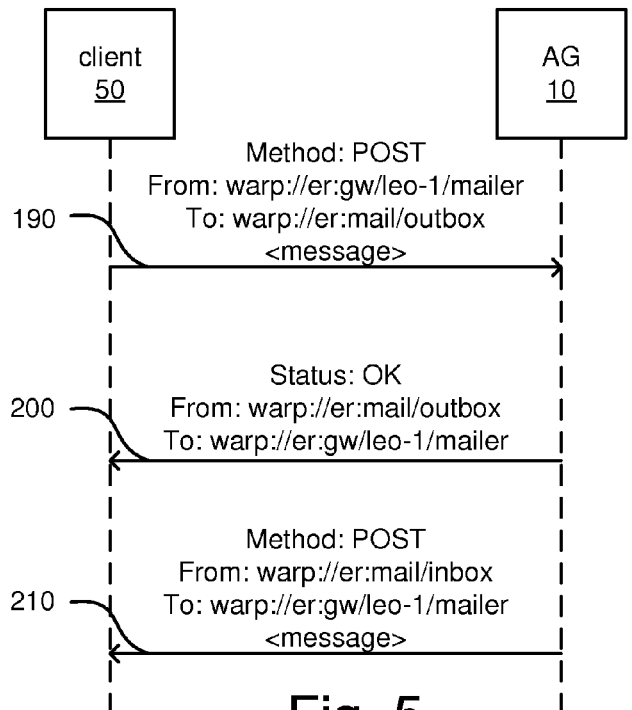

Once registered, the client 50 may send messages to the resources located in the network or other clients. For example, in FIG. 5, the mailer application on the client 50 (warp://er:gw/leo-1/mailer) talks to the resources of the mail service in the network (warp://er:mailer/ . . . ). The first pair of messages 190, 200 corresponds to posting of a mail message, and the third message 210 receiving a new mail message by the client application from the mail service.

Figure 6:
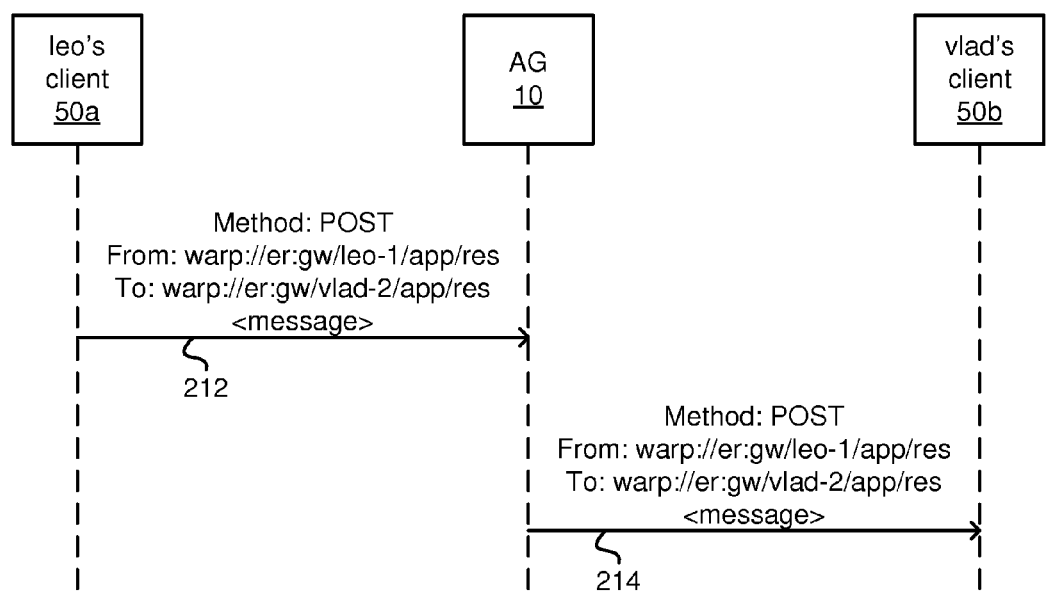

Similarly, FIG. 6 illustrates a client's 50*a* procedure of sending a message to another client 50*b* via the AG 10 in steps 212 and 214. The From header contains the address of the message originator (warp://er:gw/leo-1/app/res), and the destination address (warp://er:gw/vlad-2/app/res) is specified in the To header.

Figure 7:
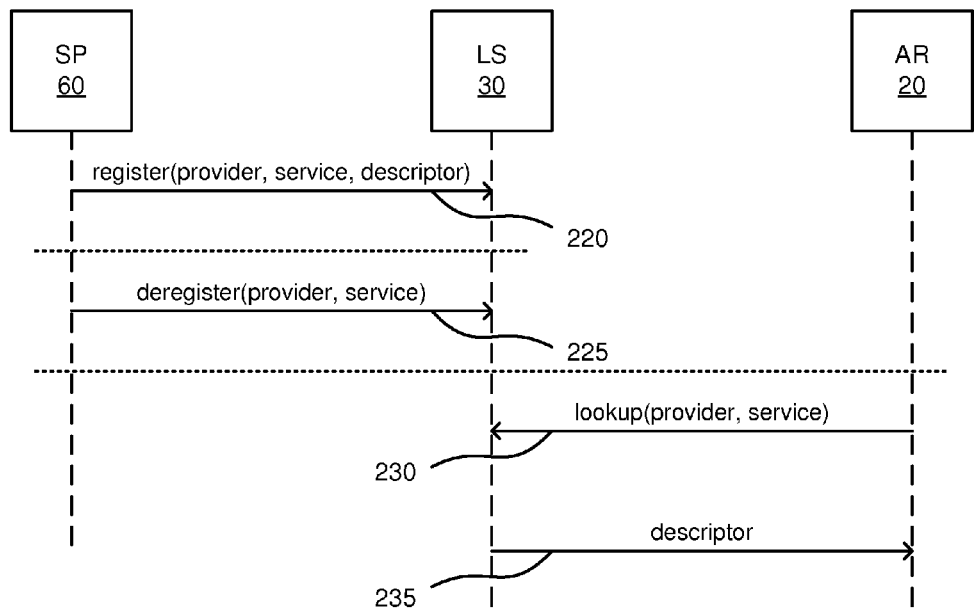

In order to facilitate service address resolution and service discovery, a central service registry may be employed, which is illustrated in FIG. 7. Upon initialization, each service generates a Service Descriptor containing the service's publicly accessible property set. The service then registers 220 this descriptor with the preconfigured LS 30, making itself discoverable. When the service becomes temporarily or permanently unavailable, it should also deregister 225 itself from the LS 30.

When the AR 20 receives a message with a destination to a service it is not aware of (i.e. information about which is not stored in its cache), it queries 230 the LS 30 for the descriptor of that service. For example, the AR 20 may send a look-up message comprising an identifier of the service and an identifier of the corresponding SP 70 to the LS 30. The descriptor is returned 235 by the LS 30 to the AR 20. Hence, in step 235, the AR 20 receives the descriptor from the LS 30. From the descriptor, the AR 20 can then deduce the applicable transport, method and URI required to facilitate the transmission of the message. It is also possible to discover available services, descriptors of which match given search criteria. In some embodiments, all services and resources have access to the LS 30, and any of them may thus employ such a discovery mechanism.

In some embodiments, the AR 20 can, depending on the deployment scenario, also perform more advanced routing than merely forwarding of the message to the target destination. Since the messages carries a relatively significant amount of metadata in the commonly formatted headers, it is possible for said headers to be introspected, and more advanced decisions taken as a result. To illustrate, a certain message could be sent by a potentially untrusted source. Before forwarding it, the AR 20 may decide to log the sender, time, and other information about the message (including, possibly, the message itself) by sending the message to a logging service. Then, to ensure the message is free of malware, send it to a malware removal service. The AR 20 can then await the modified message from the malware removal service, and send that one to the recipient, instead of the original message.

The service composition does not need to be performed by AR 20 itself Rather, in one embodiment, a decision engine is available as a separate service. The AR 20, upon encountering a message that would require composition, would query the decision engine for the applicable routing instructions, if any. Furthermore, a series of decision engines specialized towards a specific application or data structure can be employed. The decision engine can then introspect the message and come up with a potentially better routing set than if only basing the decision on the message headers.

Since a client URI (or LUID) is independent of the connectivity method and the type of access network the client 50 connects via to the AG 10, it is possible to impose and enforce quality of service requirements on the messages transferred to and from the client 50. This can be achieved by introducing several transport connections to the client 50 configured with different QoS parameters and employ transport dispatching algorithms at one or both ends of the connection. According to some embodiments of the present invention, the AG 10 may have one or both of two modes of QoS enforcement described below. The AG 10, or an associated decision engine, can attempt to transparently apply QoS priorities on the messages, based on message introspection, or decide to honor explicitly provided QoS directives, if any.

Figure 8:
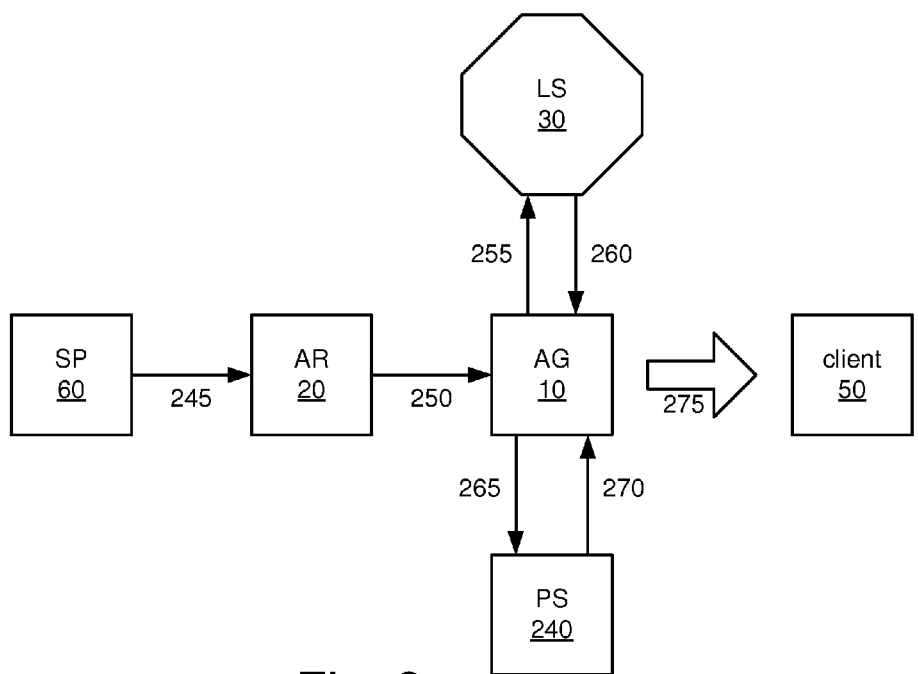

FIG. 8 illustrates such QoS enforcement where a message includes QoS directives, e.g. as part of the message header, according to an embodiment of the present invention. Such a message is sent via the AR 20 to the AG 10 (steps 245, 250). A QoS directive is stated in a specific message header including the directive, the provider and service name of the entity that applied the directive header, and a hash of the message signed with the private key of the service that added the QoS directive. These directives suggest to the AG 10 what QoS it should attempt to apply to a message: however, the AG 10 may disregard them at its discretion. Upon receipt of the QoS-marked message, the AG 10 can attempt to verify the QoS directive header by requesting the descriptor (steps 255, 260) of the entity that applied the QoS directive. The entity's public key is extracted from the descriptor and used to verify the QoS directive's integrity. If the QoS directive integrity appears compromised, the AG 10 disregards it.

If the QoS directive signature matches the directive itself, the AG 10 decides whether or not the entity that applied the directive is permitted to request such a QoS. It can do it either by an internal list, or querying a Partnering Server (PS) 240. The query to the partnering server may include the service provider and name of the QoS applying entity (step 265), and the response (step 270) may be a list of the QoS directives the entity is permitted to access as well as possibly access restrictions on each QoS directive, such as number of messages per hour, or total data permitted on a single QoS directive. Finally approved QoS may be applied to the message delivery method (step 275).

Figure 9:
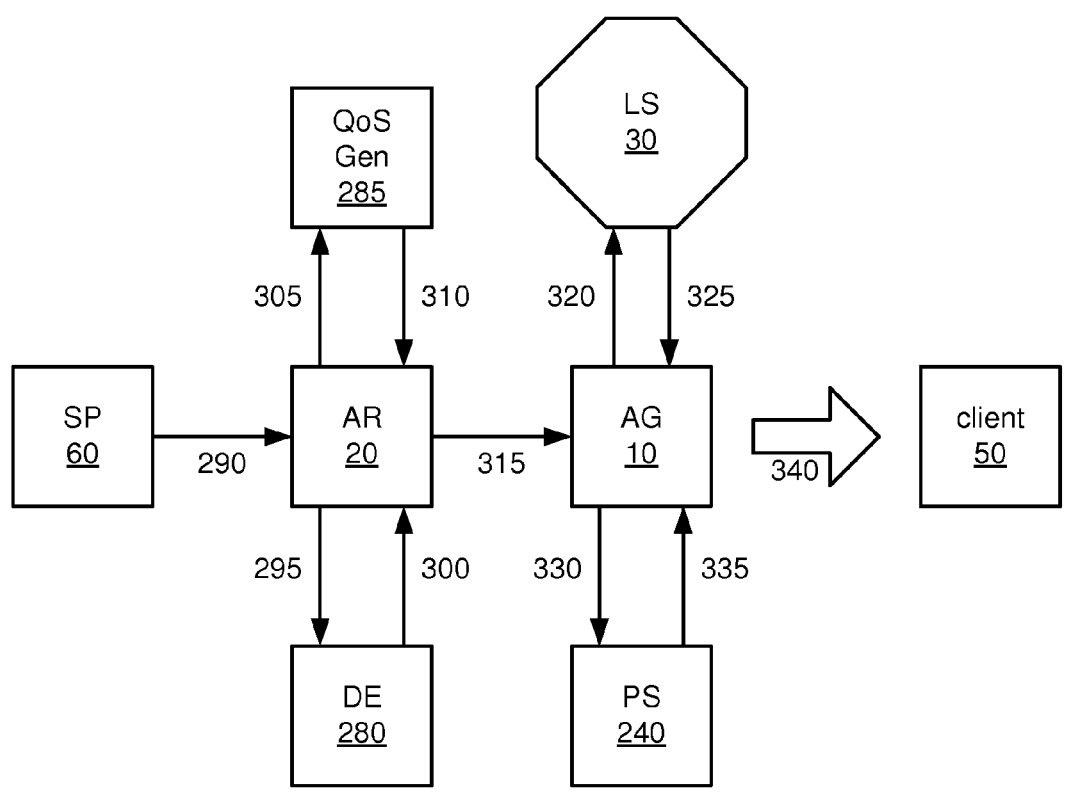

The entity that applies the QoS directive needs not be the same entity that originated the message itself. This situation is illustrated in FIG. 9. Step 290 corresponds to step 245 in FIG. 8, with the difference that the message does not comprise a QoS directive. In a deployment wherein the AR 20 employs a decision engine (DE) 280 to produce a routing composition (steps 295, 300), one hop on that list could be a QoS generating entity. The message would then be sent to the QoS generator 285 (step 305), which would apply a QoS directive, based on some internal rule set, and send the modified message back to the AR 20 (step 310). The subsequent steps 315-340 correspond to steps 250-275 in FIG. 8.

In many cases, the establishment of a trusted and/or encrypted connection is a critical part of a communications infrastructure. In addition, when dealing with mobile devices as clients, one must also take into account the volume of data transfer required to establish the secure connection, as well as limitations in the processing power of mobile devices.

According to embodiments of the present invention, a method of registering a client 50 in the AG 10 is provided. The proposed method is an SSO (Single Sign-On) solution involving the AP 40. A client 50 signs on by connecting to AG 10, which acts as a proxy to the user's AP 40 during the authentication phase. After the user has been authenticated with the AP 40, it generates a certificate of identity linking the user's identity with the client 50 connected to the AG 10. The certificate is stored at the AG 10, allowing it to securely authenticate towards network resources on behalf of the client 50.

Before connection, the client 50 generates a set of public and private cryptographic keys. According to some embodiments, these keys are instrumental in ensuring security in the authentication and may not be reused. Furthermore, the AP 40 may also have a set of public and private keys, with the AP's public key being freely available via secured means such as, for example, the Public Key Infrastructure.

The proposed registration method allows clients 50 to establish authenticated sessions to any given SP 70, using identity information provided by AP 40. Furthermore, the identification is done in such a manner that the AG 10 performs a part of the authentication on behalf of the client 50, thus reducing the amount of data transported over the client's network connection. Revoking of a client's certificate may be equivalent to terminating all of its sessions, and can be used to, for example, inactivate stolen client devices.

Figure 10:
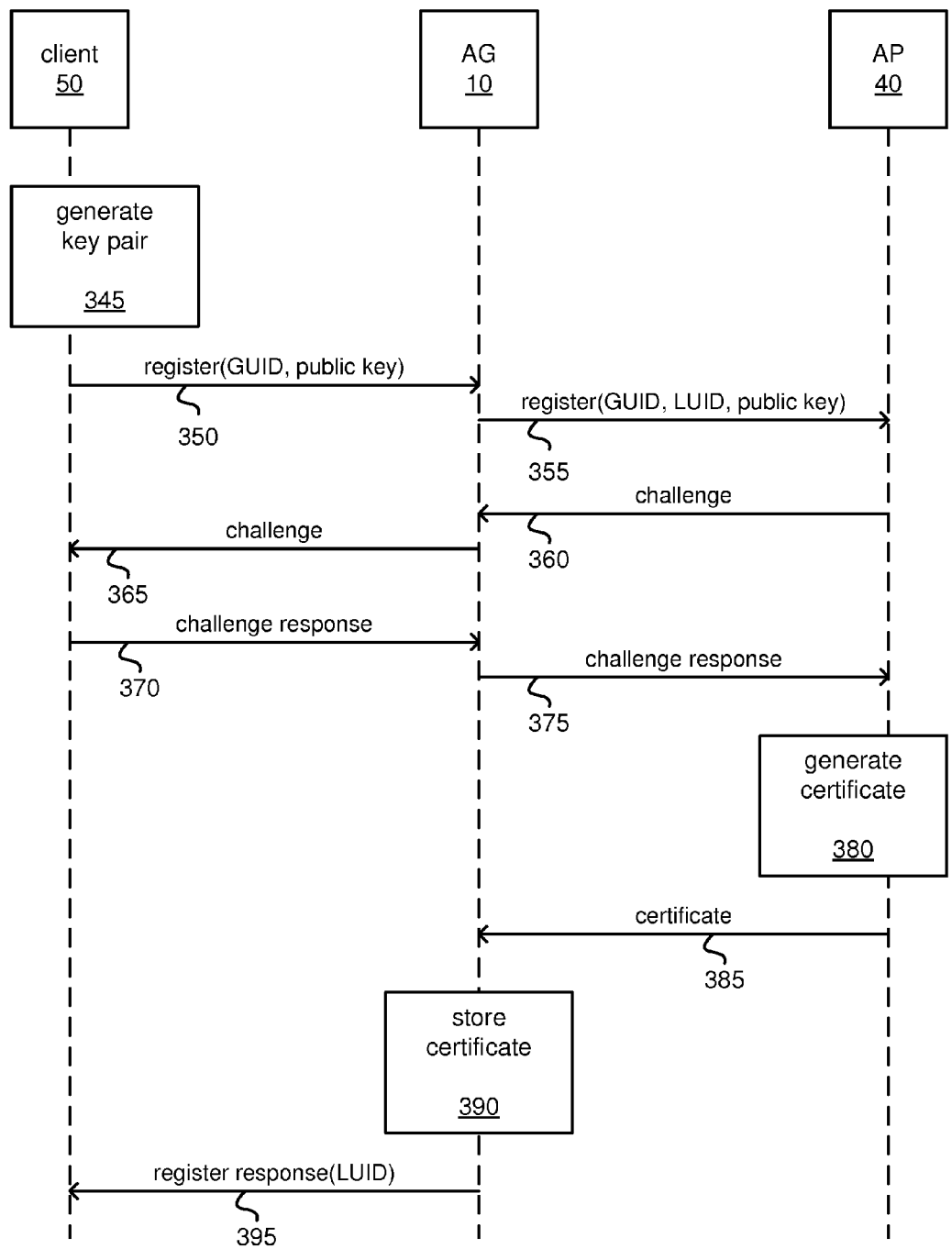

FIG. 10 illustrates an embodiment of the SSO method (which can be seen as a more detailed embodiment of that illustrated in FIG. 3). A client 50 connects to the AG 10, specifying the URI of AP the user intends to employ in order to verify his identity. Said URI is the above-mentioned GUID. Upon connection, the AG 10 issues a newly generated LUID valid for that client's session with the AG 10.

During the authentication phase, the AG 10 acts as a proxy between the client 50 and the AP 40. The client 50 and AP 40 can perform any authentication mechanism capable of resisting a man-in-the-middle attack. In the authentication process, the AP 40 is provided with the public key generated earlier by the client 50.

If the authentication of the user's identity is successful, the AP 40 creates an identity certificate for the client 50 containing the client's LUID and public key as well as the user's GUID. The certificate is marked with an expiry time, and signed with the AP's private key, allowing any party to verify its authenticity using the AP's public key. The identity certificate is sent to the AG 10, which stores it for future use. The client 50 is now authenticated with AG 10 and is fully connected.

In FIG. 10, communication between the AG 10 and the AP 40 is sent via the AR 20, which has been omitted in the figure for simplicity. In step 345, the key-pair is generated by the client 50. In step 350 (corresponding to step 130 in FIG. 3), a first registration message is sent from the client 50 and received by the AG 10. The first registration message comprises the GUID of the user and the public key of the client 50. The AG 10 then issues the LUID, and in step 355, the AG 10 sends a second registration message to the AP 40. The second registration message comprises the GUID, the client's public key, and the LUID. In step 360, the AP 40 sends an authentication challenge message which is received by the AG 10 and forwarded by the AG 10 in step 365 (corresponding to step 140 in FIG. 3) to the client 50. In step 370 (corresponding to step 150 in FIG. 3), an authentication response to the authentication challenge message, for authentication of the user's identity, is sent by the client 50 and received by the AG 10. In step 375, the authentication response is forwarded to the AP 40 by the AG 10. The AP 40 then verifies the authenticity of the user's identity and sends a result message to the AG 10 indicating whether the authentication response successfully authenticated the identity of the user. FIG. 10 illustrates the situation where the identity of the user was successfully authenticated. In that case, said certificate, comprising said LUID, the client's public key, and GUID, is generated in step 380 and encrypted with the AP's private key. The certificate is comprised in the result message sent in step 385. In step 390, the certificate is stored by the AG 10. Step 390 may further comprise obtaining the AP's public key and decrypting the certificate. Furthermore, in step 395 (corresponding to step 160 in FIG. 3), the LUID is sent to the client 50 by the AG 10 with a register response message.

If, on the other hand the authentication of the user's identity is not successful, the authentication process may be repeated, e.g. by starting over from step 360 with a new authentication challenge message from the AP 40.

Figure 11:
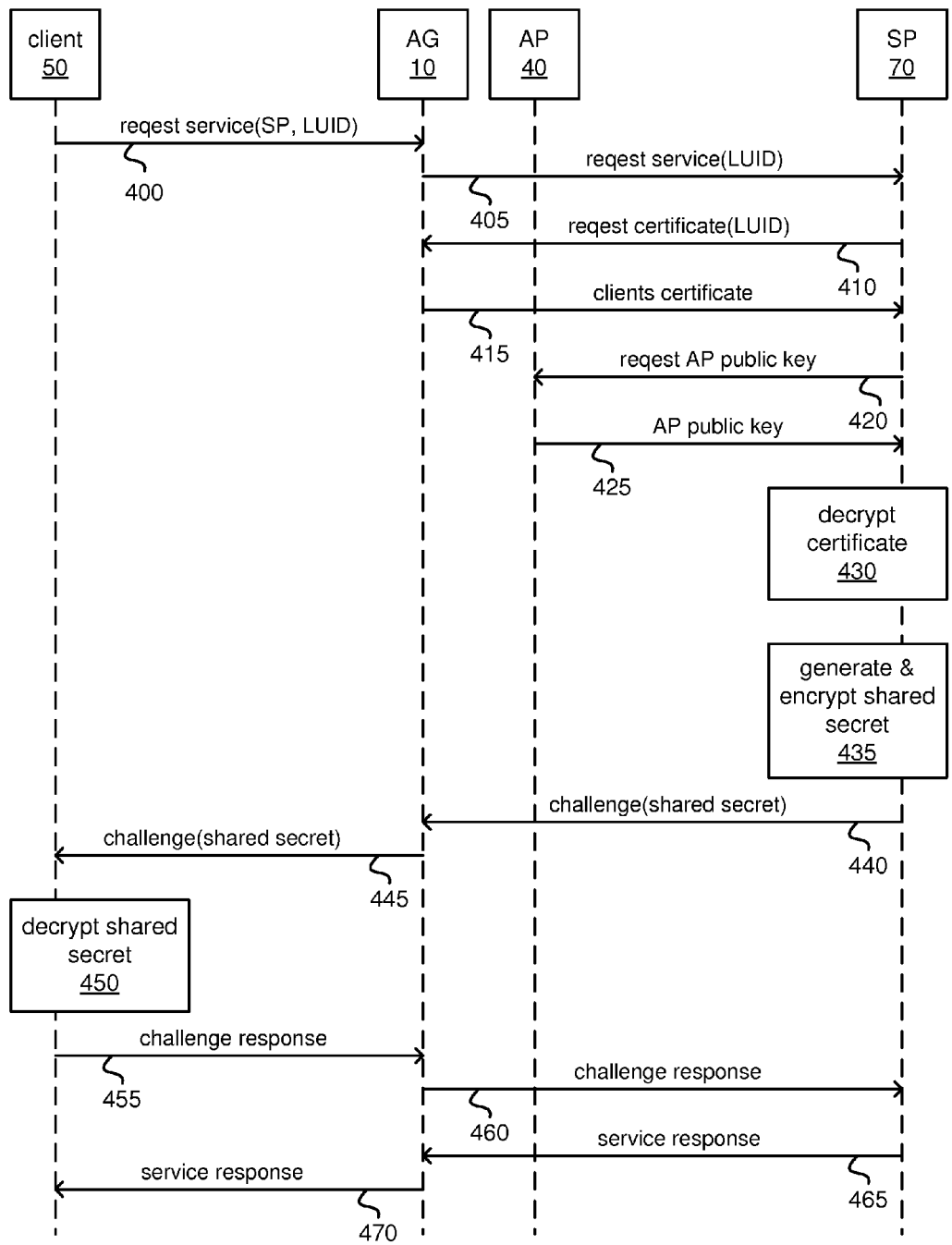

According to some embodiments of the present invention, a method of establishing a connection between a client 50, that has been registered with the AG 10 in accordance with the above, and an SP 70 is provided. An embodiment of the method is illustrated in FIG. 11.

When the client 50 wishes to set a dialog with the SP 70, it may send a regular request to the SP 70, without any concern for authentication, but including its own LUID. The SP 70 may query the AG 10 for the client's identity certificate. The SP 70 can thereby verify that the certificate is valid (e.g. the client LUID matches and the certificate is correctly signed by the AP 40). Once satisfied with its validity, the SP 70 can identify the user by the GUID specified in the certificate. If the SP 70 does not wish to serve that user, it can refuse the connection at this stage.

Should the SP 70 decide to accept the dialog, it can decide to either initiate a plain text or encrypted communication session with the client 50. The SP 70 then generates a random sequence of bytes to constitute a "shared secret" between the client 50 and the SP 70. This shared secret is encrypted with the client's public key and sent to the client 50. The client can then use the shared secret for any form of nonce authentication, such as HTTP Digest, to confirm the session to the SP 70.

In FIG. 10, communication between the AG 10 and the SP 70 is sent via the AR 20, which has been omitted in the figure for simplicity. In step 400, the client 50 sends a first service request message requesting a establishment of the connection with the SP 70, which is received by the AG 10. The first service request message comprises the LUID and an indication of the SP 70. In step 405, a second service request message is sent by the AG 10 to the indicated SP 70. The second service request message comprises the LUID of the client, and may also comprise a URI of the client's certificate on the AG 10. In step 410, a certificate request message comprising e.g. the LUID and/or said URI of the client's certificate is sent from the SP 70 and received by the AG 10. In response thereto, the AG 10 sends the clients certificate to the SP 70 in step 415. The SP 70 may then request the AP's public key with a request message (step 420) to the AP 40 and receive the AP's public key from the AP 40 (step 430). The SP 70 can then, in step 430, verify the authenticity of the client's certificate using the AP's public key obtained by the SP 70 from the AP 40. In step 435, the SP 70 generates the shared secret and encrypts it with the clients public key. In step 440, the SP 70 sends an authentication challenge message that is received by the AG 10. The authentication challenge method comprises the shared secret encrypted with the client's public key. The authentication challenge message is forwarded to the client 50 in step 445. The client 50 then decrypts the shared secret using the client's private key in step 450. Thereafter, the client 50 sends an authentication response, which is received by the AG 10, in step 455. The authentication response comprises the shared secret decrypted from the authentication challenge message using the client's private key. In step 460, the authentication response is forwarded to the SP 70 by the AG 10. In response thereto, the SP 70 issues a service response message indicating whether the SP 70 has accepted the requested establishment of connection with the client 50. The service response message is sent by the SP 70 in step 465 and received by the AG 10. In step 470, the AG 10 forwards the service response message to the client 50.

According to some embodiments of the present invention, there are provided methods of providing communication from a client 50, registered with the AG 10, to a network entity (NE), which may be another client or an SP 70. The client 50 may send a message comprising an address to the NE, a path to a resource on the NE, and a message body, which is received by the AG 10. This may e.g. correspond to step 212 (FIG. 6) or step 400 (FIG. 11). The AG 10 may then send, to the NE, a message comprising said address to the NE, said path to the resource on the NE, and a URI on the AG 10 to the client's certificate. This may e.g. correspond to step 214 (FIG. 6) or step 405 (FIG. 11).

Furthermore, in accordance with some embodiments, there are provided methods of providing communication to the client 50, registered with the AG 10, from such an NE. The NE may send a message comprising the LUID issued for the client 50, a path to a resource on the client, and a message body, which is received by the AG 10. The AG 10 may then send, to the client 50, a message comprising said LUID, said path to the resource on the client, and the message body. Hence, NEs can access resources on the client 50 transparently via the LUID without any knowledge of transport-specific details of the access network 70 used by the client 50.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended patent claims.

The invention claimed is:

1. A method in an access gateway (AG) of registering a client in the AG, wherein the AG is adapted for operation in a system for providing communication between one or more clients and one or more service providers (SP) via the AG and an application-level router (AR); wherein the system comprises the AG, the AR, and an authentication provider(AP); the method comprising:

receiving, from the client, a first registration message comprising a global user identifier (GUID) and a public key of the client; wherein the GUID is a uniform resource identifier (URI) on the AP for verifying the identity of a user of the client;

issuing a local user identifier (LUID), the LUID being a URI of a resource of the AG that maintains the client's connection to the AG;

sending to the AP, via the AR, a second registration message comprising the GUID, the client's public key, and the LUID;

receiving from the AP, via the AR, a first authentication challenge message;

forwarding the first authentication challenge message to the client;

receiving, from the client, a first authentication response to the first authentication challenge message for authentication of the user's identity;

forwarding to the AP, via the AR, the first authentication response;

receiving, from the AP, via the AR, a result message indicating whether the first authentication response successfully authenticated the identity of the user;

in response to the result message indicating that the identity of the user was successfully authenticated, forming an identity certificate comprising the LUID, the client's public key, and the GUID; wherein the identity certificate is encrypted with a private key of the AP.

2. The method of claim 1 further comprising, in response to the result message indicating that the identity of the user was successfully authenticated:

obtaining a public key of the AP;
decrypting and storing the identity certificate;
sending the LUID to the client.

3. The method of claim 1 further comprising, in response to the result message indicating that the identity of the user was not successfully authenticated, repeating the receiving a first authentication challenge message.

4. A method in an access gateway (AG) of establishing a connection between a client and a service provider (SP); wherein the AG is adapted for operation in a system for providing communication between one or more clients and one or more SPs via the AG and an application-level router (AR); wherein the system comprises the AG, the AR, and an authentication provider (AP); the method comprising:

registering the client in the AG by:

receiving, from the client, a first registration message comprising a global user identifier (GUID) and a public key of the client; wherein the GUID is a uniform resource identifier (URI) on the AP for verifying the identity of a user of the client;

issuing a local user identifier (LUID), the LUID being a URI of a resource of the AG that maintains the client's connection to the AG;

sending to the AP, via the AR, a second registration message comprising the GUID, the client's public key, and the LUID;

receiving from the AP, via the AR, a first authentication challenge message;

forwarding the first authentication challenge message to the client;

receiving, from the client, a first authentication response to the first authentication challenge message for authentication of the user's identity;

forwarding to the AP, via the AR, the first authentication response;

receiving, from the AP, via the AR, a result message indicating whether the first authentication response successfully authenticated the identity of the user;

in response to the result message indicating that the identity of the user was successfully authenticated, forming an identity certificate comprising the LUID, the client's public key, and the GUID; wherein the identity certificate is encrypted with a private key of the AP; thereafter:

receiving, from the client, a first service request message requesting establishment of the connection, wherein the first request message comprises the LUID and an indication of the SP;

sending to the SP, via the AR, a second service request message comprising the LUID and a URI of the identity certificate on the AG;

receiving, from the SP, via the AR, a certificate request message comprising the URI of the identity certificate;

sending the identity certificate to the SP via the AR for allowing the SP to verify the authenticity of the identity certificate using a public key of the AP;

receiving from the SP, via the AR, a second authentication challenge message comprising a shared secret encrypted with a public key of the client;

forwarding the second authentication challenge message to the client;

receiving, from the client, a second authentication response comprising the shared secret decrypted from the second authentication challenge message using the private key of the client;

forwarding the second authentication response to the SP via the AR;

receiving from the SP, via the AR, a service response message indicating whether the SP has accepted the requested establishment of the connection;

forwarding the service response message to the client.

5. A method in an access gateway (AG) of removing a registration of a client in the AG; wherein the AG is adapted for operation in a system for providing communication between one or more clients and one or more service providers (SP), via the AG and an application-level router (AR); wherein the system comprises the AG, the AR, and an authentication provider (AP); the method comprising:
   registering the client in the AG by:
      receiving, from the client, a first registration message comprising a global user identifier (GUID) and a public key of the client; wherein the GUID is a uniform resource identifier (URI) on the AP for verifying the identity of a user of the client;
      issuing a local user identifier (LUID), the LUID being a URI of a resource of the AG that maintains the client's connection to the AG;
      sending to the AP, via the AR, a second registration message comprising the GUID, the client's public key, and the LUID;
      receiving from the AP, via the AR, a first authentication challenge message;
      forwarding the first authentication challenge message to the client;
      receiving, from the client, a first authentication response to the first authentication challenge message for authentication of the user's identity;
      forwarding to the AP, via the AR, the first authentication response;
      receiving, from the AP, via the AR, a result message indicating whether the first authentication response successfully authenticated the identity of the user;
      in response to the result message indicating that the identity of the user was successfully authenticated, forming an identity certificate comprising the LUID, the client's public key, and the GUID; wherein the identity certificate is encrypted with a private key of the AP;
   thereafter receiving, from the client, a removal request message comprising the LUID, and, in response thereto:
   removing the registration of the client in the AG;
   sending an acknowledgement message to the client indicating that the registration has been removed.

6. A method in an access gateway (AG) of providing communication from a client to a network entity (NE) which is either another client or a service provider (SP); wherein the AG is adapted for operation in a system for providing communication between one or more clients and one or more SPs via the AG and an application-level router (AR); wherein the system comprises the AG, the AR, and an authentication provider (AP); the method comprising:
   registering the client in the AG by:
      receiving, from the client, a first registration message comprising a global user identifier (GUID) and a public key of the client; wherein the GUID is a uniform resource identifier (URI) on the AP for verifying the identity of a user of the client;
      issuing a local user identifier (LUID), the LUID being a URI of a resource of the AG that maintains the client's connection to the AG;
      sending to the AP, via the AR, a second registration message comprising the GUID, the client's public key, and the LUID;
      receiving from the AP, via the AR, a first authentication challenge message;
      forwarding the first authentication challenge message to the client;
      receiving, from the client, a first authentication response to the first authentication challenge message for authentication of the user's identity;
      forwarding to the AP, via the AR, the first authentication response;
      receiving, from the AP, via the AR, a result message indicating whether the first authentication response successfully authenticated the identity of the user;
      in response to the result message indicating that the identity of the user was successfully authenticated, forming an identity certificate comprising the LUID, the client's public key, and the GUID; wherein the identity certificate is encrypted with a private key of the AP; thereafter:
   receiving, from the client, a message comprising an address to the NE, a path to a resource on the NE, and a message body;
   sending, to the NE, a message comprising the address to the NE, the path to the resource on the NE, the message body, and a URI on the AG to the identity certificate of the client.

7. A method in an access gateway (AG) of providing communication to a client from a network entity (NE) which is either another client or a service provider (SP); wherein the AG is adapted for operation in a system for providing communication between one or more clients and one or more SPs via the AG and an application-level router (AR); wherein the system comprises the AG, the AR, and an authentication provider (AP); the method comprising:
   registering the client in the AG by:
      receiving, from the client, a first registration message comprising a global user identifier (GUID) and a public key of the client; wherein the GUID is a uniform resource identifier (URI) on the AP for verifying the identity of a user of the client;
      issuing a local user identifier (LUID), the LUID being a URI of a resource of the AG that maintains the client's connection to the AG;
      sending to the AP, via the AR, a second registration message comprising the GUID, the client's public key, and the LUID;
      receiving from the AP, via the AR, a first authentication challenge message;
      forwarding the first authentication challenge message to the client;
      receiving, from the client, a first authentication response to the first authentication challenge message for authentication of the user's identity;
      forwarding to the AP, via the AR, the first authentication response;
      receiving, from the AP, via the AR, a result message indicating whether the first authentication response successfully authenticated the identity of the user;
      in response to the result message indicating that the identity of the user was successfully authenticated, forming an identity certificate comprising the LUID, the client's public key, and the GUID; wherein the identity certificate is encrypted with a private key of the AP; thereafter:
   receiving, from the NE, a message comprising the LUID issued for the client, a path to a resource on the client, and a message body;
   sending, to the client, a message comprising the LUID, the path to the resource on the client, and the message body.

8. A method in an access gateway (AG) of applying a quality of service (QoS) directive to a first message from a service provider (SP) to a client; wherein the AG is adapted for operation in a system for providing communication between one or more clients and one or more SPs via the AG and an application-level router (AR); wherein the system comprises the AG, the AR, an authentication provider (AP), and a look-up service (LS), the LS adapted to keep a registry of descriptors of available services, the descriptors comprising a public key of the SP providing the service; the method comprising:

registering the client in the AG by:

receiving, from the client, a first registration message comprising a global user identifier (GUID) and a public key of the client; wherein the GUID is a uniform resource identifier (URI) on the AP for verifying the identity of a user of the client;

issuing a local user identifier (LUID), the LUID being a URI of a resource of the AG that maintains the client's connection to the AG;

sending to the AP, via the AR, a second registration message comprising the GUID, the client's public key, and the LUID;

receiving from the AP, via the AR, a first authentication challenge message;

forwarding the first authentication challenge message to the client;

receiving, from the client, a first authentication response to the first authentication challenge message for authentication of the user's identity;

forwarding to the AP, via the AR, the first authentication response;

receiving, from the AP, via the AR, a result message indicating whether the first authentication response successfully authenticated the identity of the user;

in response to the result message indicating that the identity of the user was successfully authenticated, forming an identity certificate comprising the LUID, the client's public key, and the GUID; wherein the identity certificate is encrypted with a private key of the AP; thereafter:

receiving from the SP, via the AR, the first message to the client, receiving, from the AR, the QoS directive;

sending, to the LS, a look up message comprising an identifier of the SP;

receiving, from the LS, a response to the look up message, the response comprising the descriptor of the SP;

verifying the integrity of the QoS directive using a public key of the SP;

determining whether the SP is allowed to request the application of the QoS directive;

in response to the SP being allowed to request the application of the QoS directive, sending the message to the client with the QoS directive applied.

9. The method of claim 8 wherein the QoS directive is included in the first message sent from the SP.

10. The method of claim 8:
    wherein the system further comprises a QoS generator adapted to generate QoS directives;
    further comprising the QoS generator sending the QoS directive to the AR in response to the AR sending the first message from the SP to the QoS generator.

11. The method of claim 8 wherein the determining whether the SP is allowed to request the application of the QoS directive comprises consulting an internal list of the AG indicating which SPs are allowed to request application of what QoS directives.

12. The method of claim 8 wherein the determining whether the SP is allowed to request the application of the QoS directive comprises consulting a partnering service (PS) external to the AG, wherein the PS is adapted to keep track of which SPs are allowed to request application of what QoS directives.

13. An access gateway (AG) for operation in a system for providing communication between one or more clients and one or more service providers (SP); the system comprising the AG, an application level router (AR) for routing messages between clients and SPs, an authentication provider (AP) for verifying the identity of users of clients, and a look-up service (LS) for keeping a registry of currently available services; the AG configured to, for each client connected to it:

maintain transport-specific connections for one or more connections between the client and the AG over one or more access networks;

assign, to the client, a local user identifier (LUID), the LUID being a uniform resource identifier (URI) that can be used for accessing resources of the client regardless of which access network the client is connected via;

receive, from the client, a first registration message comprising a global user identifier (GUID) and a public key of the client; wherein the GUID is a uniform resource identifier (URI) on the AP for verifying the identity of a user of the client;

issue a local user identifier (LUID), the LUID being a URI of a resource of the AG that maintains the client's connection to the AG;

send to the AR via the AR, a second registration message comprising the GUID, the client's public key, and the LUID;

receive from the AP, via the AR, a first authentication challenge message; forward the first authentication challenge message to the client;

receive, from the client, a first authentication response to the first authentication challenge message for authentication of the user's identity;

forward to the AR via the AR, the first authentication response;

receive, from the AR via the AR, a result message indicating whether the first authentication response successfully authenticated the identity of the user;

in response to the result message indicating that the identity of the user was successfully authenticated, form an identity certificate comprising the LUID, the client's public key, and the GUID; wherein the identity certificate is encrypted with a private key of the AP.

14. A system for providing communication between one or more clients and one or more service providers (SP) comprising:

a look-up service (LS) for keeping a registry of currently available services;

an application-level router (AR);

an authentication provider (AP);

an access gateway (AG); the AG configured to:

receive, from a client, a first registration message comprising a global user identifier (GUID) and a public key of the client; wherein the GUID is a uniform resource identifier (URI) on the AP for verifying the identity of a user of the client;

issue a local user identifier (LUID), the LUID being a URI of a resource of the AG that maintains the client's connection to the AG;

send to the AP, via the AR, a second registration message comprising the GUID, the client's public key, and the LUID;

receive from the AP, via the AR, a first authentication challenge message;
forward the first authentication challenge message to the client;
receive, from the client, a first authentication response to the first authentication challenge message for authentication of the user's identity;
forward to the AP, via the AR, the first authentication response;
receive, from the AP, via the AR, a result message indicating whether the first authentication response successfully authenticated the identity of the user;
in response to the result message indicating that the identity of the user was successfully authenticated, form an identity certificate comprising the LUID, the client's public key, and the GUID; wherein the identity certificate is encrypted with a private key of the AP.

* * * * *

UNITED STATES PATENT AND TRADEMARK OFFICE
CERTIFICATE OF CORRECTION

PATENT NO.        : 8,707,418 B2                                    Page 1 of 1
APPLICATION NO.   : 13/504055
DATED             : April 22, 2014
INVENTOR(S)       : Mokrushin et al.

It is certified that error appears in the above-identified patent and that said Letters Patent is hereby corrected as shown below:

In the Specification:

In Column 7, Line 42, delete "itself" and insert -- itself. --, therefor.

In the Claims:

In Column 16, Line 30, in Claim 13, delete "AR via" and insert -- AP, via --, therefor.

In Column 16, Line 39, in Claim 13, delete "AR via" and insert -- AP, via --, therefor.

In Column 16, Line 41, in Claim 13, delete "AR via" and insert -- AP, via --, therefor.

Signed and Sealed this
Thirtieth Day of September, 2014

Michelle K. Lee
*Deputy Director of the United States Patent and Trademark Office*